United States Patent Office 2,848,446
Patented Aug. 19, 1958

2,848,446

AZO DYESTUFFS

Piero Maderni, Basel, Switzerland, assignor, by mesne assignments, to Saul & Co., Newark, N. J., as nominee of Fidelity Union Trust Company, executive trustee under Sandoz Trust No Drawing. Application January 20, 1955
Serial No. 483,163

Claims priority, application Switzerland
February 23, 1954

6 Claims. (Cl. 260—147)

This invention relates to new monoazo dyestuffs and chromium complex compounds obtained therewith.

The new monoazo dyestuffs correspond, in the metal-free state, to the formula

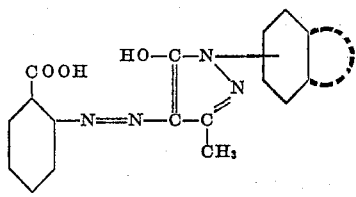

wherein the dotted line represents the bivalent radical
—CH=CH—CH=CH— or

—CH$_2$—CH$_2$—CH$_2$—CH$_2$—

They are obtained, according to the present invention, by coupling 1-naphthyl-(1' or 2')-3-methyl-5-pyrazolones which may be hydrogenated in the naphthalene nucleus in the 5'-, 6'-, 7'- and 8'-positions, with diazotized 2-aminobenzene-1-carboxylic acid, and the monoazo dyestuffs thus obtained treated with chromium yielding agents in substance or on the fiber.

The coupling of the diazotized 2-aminobenzene-1-carboxylic acid with the 1-naphthyl-3-methyl-5-pyrazolones takes place advantageously in an alkaline medium. The monoazo dyestuffs formed are filtered off and dried. They dissolve in water with a yellow coloration and dye wool by the single bath chroming process in yellow shades of most excellent fastness to light, to milling, and to carbonizing.

Conversion into the chromium-containing azo dyestuffs is carried out with chromium salts, e. g. chromium fluoride, chromium sulfate, chromium formate, chromium acetate or potassium chromium sulfate in an aqueous suspension or solution, or in an organic medium, as for example in polyglycol or in formamide, or in the melt of an alkali salt of a lower molecular aliphatic monocarboxylic acid. Chromates as for example sodium or potassium chromate or bichromate are also suitable for metallizing, which in this case is advantageously carried out in a caustic alkali medium, if desired in the presence of a reducing agent. Metallizing in substance furnishes chromium complex compounds which contain less than 2 atoms and advantageously about 1 atom of chromium per 2 molecules of the monoazo dyestuffs.

The chromium-containing azo dyestuffs are advantageously separated out from an aqueous medium by the addition of common salt; when the metallization was carried out in an organic medium this may be done after pouring the metallizing solution into water. After that the dyestuffs are filtered off, washed, if desired, and finally dried. They are dark yellow powders which dissolve in water with a yellow coloration and which dye wool, silk and artificial nitrogenous fibers, e. g. synthetic polyamide fibers, in yellow shades which are fast to light, washing and milling.

The following examples illustrate the invention without limiting it. The parts therein denote parts by weight, the percentages are by weight and the temperatures are given in degrees centigrade.

Example 1

A cold solution obtained by diazotizing 13.7 parts of 2-aminobenzene-1-carboxylic acid is treated with a cold solution of 23.5 parts of 1-naphthyl-(1')-3-methyl-5-pyrazolone (M. P. 170–172°) in 400 parts of water and 40 parts of 30% sodium hydroxide solution. The material is stirred at 0–5° until coupling is completed. After addition of sodium bicarbonate to the coupling product, the precipitated monoazo dyestuff is filtered off and dried in vacuo at 95°. A yellow powder is obtained which dissolves in water and in dilute sodium hydroxide solution with a greenish yellow and in concentrated sulfuric acid with a yellow coloration and dyes wool according to the single bath chroming process in pure yellow shades which are fast to light, milling and carbonizing.

The dyestuff corresponds to the formula

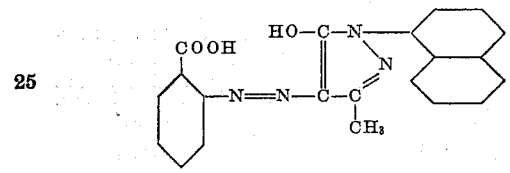

Example 2

For the conversion of the monoazo dyestuff obtained according to the previous example into the chromium complex compound, 3.7 parts thereof are heated in 40 parts of ethylpolyglycol together with 1.9 parts of chromium formate for 2½ hours at 95–105°. Thereupon the solution is poured into 100 parts of 5% sodium chloride solution. The precipitated chromium complex compound is filtered off and suspended in about 100 parts of water at 70°. By the addition of sodium hydroxide solution the suspension is made alkaline to phenolphthalein, the chromium-containing azo dyestuff thereupon filtered off, and dried at 80°. It is a dark yellow powder which dissolves in dilute sodium hydroxide solution with a yellow coloration and in concentrated sulfuric acid with a greenish yellow coloration and dyes wool, silk, and synthetic polyamide fibers in pure yellow shades which are fast to light, washing and milling.

The dyestuff corresponds to the formula

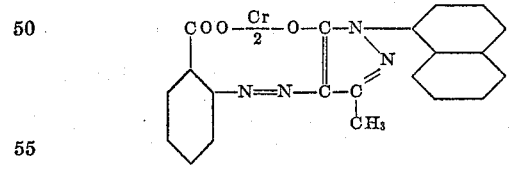

Example 3

If the 23.5 parts of 1-naphthyl-(1')-3-methyl-5-pyrazolone of Example 1 is replaced by 23.5 parts of 1-naphthyl-(2')-3-methyl-5-pyrazolone and the monoazo dyestuff obtained is metallized according to the data given in Example 2, then a chromium complex compound is obtained which has the same dyeing properties as that obtained according to Example 2.

The dyestuff corresponds to the formula

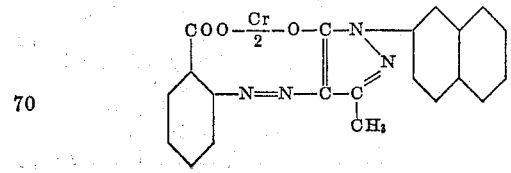

Example 4

7.2 parts of 1-(5', 6', 7', 8'-tetrahydro)-naphthyl-(1')-3-methyl-5-prazolone are suspended in 150 parts of water. The suspension is brought to a pH value of 11.5–12 by means of sodium hydroxide and is then treated with 7.5 parts of sodium carbonate. After cooling to 2–4°, a cold solution obtained by diazotizing 4.1 parts of 2-aminobenzene-1-carboxylic acid is added thereto with stirring. After coupling is finished, the separated monoazo dyestuff is filtered off and dried at 80–90°. One obtains a yellow powder which dissolves in sodium hydroxide solution as well as in concentrated sulfuric acid with a greenish yellow coloration, and dyes wool according to the single bath chroming process in pure yellow shades which are fast to light, milling and carbonizing.

The dyestuff corresponds to the formula

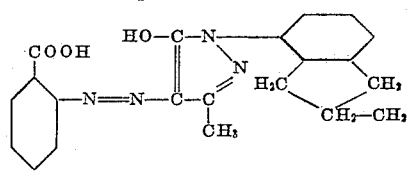

Example 5

The monoazo dyestuff obtained according to the foregoing example is converted into the chromium complex compound in the following manner: 6 parts thereof are heated in 60 parts of ethylpolyglycol together with 2.5 parts of chromium formate for 4 hours at 95–105°. Hereupon the solution is poured into 100 parts of 5% sodium chloride solution. The precipitated chromium complex compound is filtered off, washed with 5% sodium chloride solution and dried at 70°. A yellow powder is obtained which dissolves in dilute sodium hydroxide solution with a yellow coloration and in concentrated sulfuric acid with a greenish yellow coloration and dyes wool, silk, and synthetic polyamide fibers in pure yellow shades which are fast to light, washing and milling.

The dyestuff corresponds to the formula

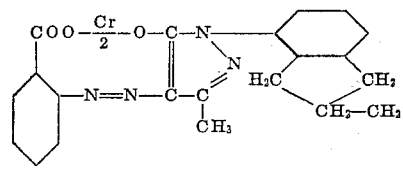

Example 6

If the 7.2 parts of 1-(5',6',7',8'-tetrahydro)-naphthyl-(1')-3-methyl-5-pyrazolone of Example 4 are replaced by 7.2 parts of 1-(5',6',7',8'-tetrahydro)-naphthyl-(2')-3-methyl-5-pyrazolone and the resultant monoazo dyestuff is metallized according to the process described in Example 5, then a chromium complex compound is obtained the dyeing properties of which are similar to those of the product obtained according to Example 5.

The dyestuff corresponds to the formula

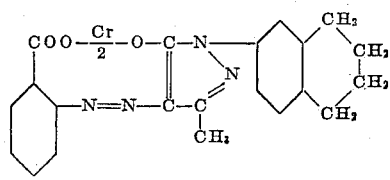

Example 7

A dyebath is made from 4000 parts of water, 1 part of the dyestuff capable of being converted into the chromium complex obtained in accordance with Example 1, 1 part of potassium chromate, 7 parts of ammonium sulfate and 10 parts of Glauber salt, and 100 parts of wool are placed into the dyebath at 40°. The bath is heated over a period of 30 minutes to boiling and is kept at the boiling point for 90 minutes. The dyed wool is then removed from the bath, is rinsed with water and is dried.

Example 8

100 parts of wool are put into a dyebath made from 1 part of the chromium-containing azo dyestuff obtained as in Example 2, 4000 parts of water and 5 parts of ammonium sulfate at 40°. The bath is heated to boiling over a period of 30 minutes and is kept at the boiling point for 60 minutes. After a short cooling the dyed wool is removed from the bath and is rinsed with water and dried.

Synthetic polyamide fibers are dyed in similar manner. Silk is dyed similarly but at a slightly lower temperature, for example, at 95°.

Having thus disclosed the invention, what is claimed is:

1. A member selected from the group consisting of an azo dyestuff and its chromium complex compound which, in the metal-free state, corresponds to the formula

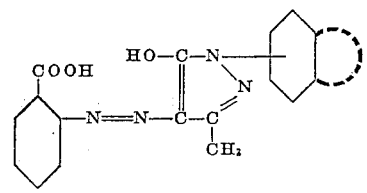

wherein the dotted line represents a bivalent radical selected from the group consisting of

—CH=CH—CH=CH— and —CH$_2$—CH$_2$—CH$_2$—CH$_2$—.

2. The azo dyestuff which corresponds to the formula

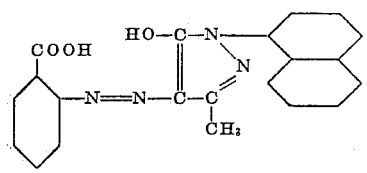

3. The azo dyestuff which corresponds to the formula

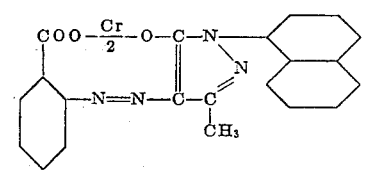

4. The azo dyestuff which corresponds to the formula

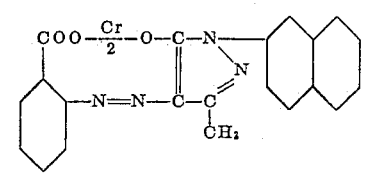

5. The azo dyestuff which corresponds to the formula

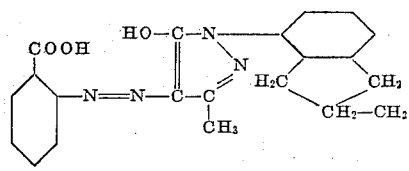

6. The azo dyestuff which corresponds to the formula
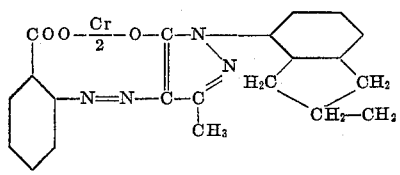
References Cited in the file of this patent
UNITED STATES PATENTS
| | | |
|---|---|---|
| 1,556,329 | Kaltwasser et al. | Oct. 6, 1925 |
| 2,028,981 | Krzikalla et al. | Jan. 28, 1936 |
| 2,727,031 | Zickendraht et al. | Dec. 13, 1955 |
FOREIGN PATENTS
| | | |
|---|---|---|
| 513,360 | Belgium | Feb. 6, 1953 |

UNITED STATES PATENT OFFICE
Certificate of Correction

Patent No. 2,848,446                                              August 19, 1958

Piero Maderni

It is hereby certified that error appears in the printed specification of the above numbered patent requiring correction and that the said Letters Patent should read as corrected below.

Column 3, line 3, for "-5-prazolone" read ––-5-pyrazolone––; lines 18 to 22, Example 4, and lines 42 to 45, Example 5, the right-hand portion of each formula should appear as shown below instead of as in the patent:

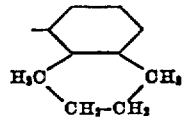

column 4, lines 69 to 73, claim 5, and column 5, lines 2 to 7, claim 6, the right-hand portion of each formula should appear as shown below instead of as in the patent:

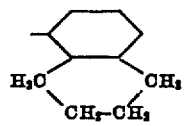

Signed and sealed this 17th day of November 1959.

[SEAL]

Attest:
KARL H. AXLINE,
*Attesting Officer.*

ROBERT C. WATSON,
*Commissioner of Patents.*